United States Patent [19]
Lorenzen

[11] Patent Number: 6,033,678
[45] Date of Patent: Mar. 7, 2000

[54] MICROCLUSTERED WATER

[76] Inventor: Lee H. Lorenzen, P.O. Box 405, Trabuco Canyon, Calif. 92678

[21] Appl. No.: 08/984,777

[22] Filed: Dec. 4, 1997

Related U.S. Application Data

[63] Continuation of application No. 08/208,799, Mar. 9, 1994, Pat. No. 5,711,950, which is a continuation of application No. 07/990,357, Dec. 15, 1992, abandoned, which is a continuation of application No. 07/670,032, Mar. 15, 1991, abandoned, which is a continuation-in-part of application No. 07/463,988, Jan. 12, 1990, abandoned.

[51] Int. Cl.$^7$ .................................................. A61K 31/695
[52] U.S. Cl. ......................... 424/401; 424/439; 424/93.1; 424/93.51; 606/3; 607/1; 508/136
[58] Field of Search ..................... 424/401, 439, 424/93.1, 93.51; 606/3; 607/1; 508/136

[56] References Cited

PUBLICATIONS

*Chemical Abstracts*, vol. 84. No. 2, Abstract No. 9105e, publication year 1975.
*Chemical Abstracts*, vol. 106, No. 16, Abstract No. 126215z, publication year 1986.
*Chemical Abstracts*, vol. 106, No. 14, Abstract No. 108250c, publication year 1985.
*Chemical Abstracts*, vol. 104, No. 12, Abstract No. 96093x, publication year 1986.
Briant, et al., "Molecular Dynamics Study of Water Microclusters", *The Journal of Chemical Physics*, vol. 63, No. 8, Oct. 15, 1975, pp. 3327–3333.
"Water as a Free Electric Dipole Laser", *Physical Review Letters*, 61:1085–1088; E. Giudice et al.; 1988.
"Magnetic Flux Quantization and Josephson Behaviour In Living Systems", *Physica Scripta*, 40:786–791; E. Guidice et al.; 1989.
"pK Shift of Functional Group in Mechanochemical Coupling Due to Phdrophobic Effect . . . ", *Biochemical and Biophysical Research Communications*, 153:832–839; D. Urry et al.; 1988.
"The Effect on Water and Ions on the Energy Band Structure of Periodic . . . ", *Acta Biiochim. Biophys. Hung.*, 22:205–214, R. Chen et al.; 1987.
"Role of Water in the Energy of Hydrolysis of Phosphate Compounds . . . ", *Biochicica et Biophysica Acta*, 973:333–349, L. DeMeis; 1989.
"Resonant Microwave Absorption of Selected DNA Molecules", *Physical Review Letters*, 53:1284–1286, G. Edwards et al.; 1984.
"Negatively Charged Water Clusters or the First Observation of . . . ", *Physical Review Letters*, 47:323–326, M. Armbruster et al.; 1981.

"Resonance Emissioin Studies of the Photodissociating Water Molecule", *Chemical Physics*, 141:393–400, R. Sension et al.; 1990.
"Cluster Expansion of the Wavefunction", *Chemical Physics Letters*, 79:292–298, K. Hirao et al.; 1981.
"The Roles of Protein Kinases and Phosphatases in Signal Transduction", *Society for Experimental Biology*, 241–255, D. Hardie; 1990.
"Comparative Study of Energy–Transducing Properties of Cytoplasmic . . . ", *The Journal of Microbiology*, 170:2359–2366, W. Vrij et al.; 1988.
"Molecular Recognition and Metal Ion Template Snythesis", *Science*, 26:938–943, T. McMurray et al.; 1989.
"A Critical Examination of the Bioplasma Hypothesis", *Physiological Chemistry and Physics and Medical NMR*, 18:89–101, T. Quickenden et al.; 1986.
"Physical Plasma and Biological Solids: A Possible Mechanism for Resonant . . . ", *Physiological Chemistry and Physics*, 11:501–506., J. Zon; 1979.
"The Living Cell as a Plasma Physical System", *Physiological Chemistry and Physics*, 12:357–364, J. Zon; 1980.
"The Role of Inductive Effect in the Determination of Protein Structure", *Physiological Chemistry and Physics and Medical NMR*, 18:3–16, G. Ling (1986).
"A New Theory of the Water Contents of Living Cells in Solutions Containing Different . . . ", *Physiological Chemistry and Physics and Medical NMR*, 18:131, G. Ling; 1986.
"Modulation of Reaction Kinetics Via an Apparently Novel . . . ", *Physiological Chemistry and Physics and Medical NMR*, 18:251–262, f. Etzler et al.; 1986.
"Water Clusters", *Science*, 271:929–933, K. Liu et al.; Feb. 16, 1996.

*Primary Examiner*—Raj Bawa
*Attorney, Agent, or Firm*—Knobbe, Martens, Olson & Bear, LLP.

[57] ABSTRACT

Microclustered water is produced from a starting water. First, the starting water is boiled to produce steam. Next, the steam is passed across a magnetic field, and the steam is condensed at a temperature greater than 0° C. in the presence of light in the far infra-red to ultraviolet spectrum range to produce condensed steam. At least one metasilicate salt stabilizer and a dietary supplement template are added to the condensed steam. The concentration of dietary supplement template is 1% or less. The condensed steam is exposed to a pressure greater than 1 atmosphere; and then depressurized to produce the microclustered water. The microclustered water produces an $^{17}O$ NMR resonance signal less than 115 Hz, has a conductivity of at least 3.7 μs/cm, and has a surface tension of less than 61 dynes/cm.

20 Claims, 2 Drawing Sheets

MICROCLUSTERED WATER

CROSS REFERENCE TO RELATED APPLICATIONS

This application is a continuation of prior application Ser. No. 08/208,799, filed Mar. 9, 1994, now U.S. Pat. No. 5,711,950, which is a continuation of application Ser. No. 07/990,357, filed Dec. 15, 1992, now abandoned, which is a continuation of application Ser. No. 07/670,032 filed Mar. 15, 1991, now abandoned, which is a continuation-in-part of application Ser. No. 07/463,988, filed Jan. 12, 1990, now abandoned.

FIELD OF THE INVENTION

The invention relates generally to microclustered water. More specifically, the invention relates to the synthesis and treatment of microclustered water to produce water having useful properties in a variety of environments.

BACKGROUND OF THE INVENTION

It is well known that water is composed of individual water molecules that associate with others through hydrogen bonding. From statistical and mechanical analyses of water, it was found that liquid water may be regarded as a mixture of hydrogen bonded clusters and unbonded molecules. Considini, D. M., Editor-in-Chief, *Encyclopedia of Chemistry,* Van Nostrand Reinhold Co., New York (1984). Thereafter it was shown that water can be characterized by five species: unbonded molecules, tetrahydrogen bonded molecules in the interior of a cluster; and surface molecules connected to the cluster by 1, 2 or 3 hydrogen bonds. Id. Under normal conditions, natural clustering of water molecules is short lived and the cluster size is unpredictable. Water which has been treated to have a more ordered and stable clustering of water molecules, shall be referred to herein as "microclustered" water.

"The presence of dissolved solutes causes the structure and properties of liquid water to change." Lehninger, A. L. *Biochemistry* p. 44 (1975). For example, when sodium chloride is dissolved in water, water molecules surround the sodium and chloride ions to produce ion hydrates. The resulting geometry of the water molecules differs from that of the prior clusters of hydrogen-bonded water molecules. The water molecules become more highly ordered and regular in structure. The addition of sodium chloride to microclustered water effects the same result. Thus, the sodium chloride may be said to function as a "template" for the change. As used herein, "template" refers to any material which is used with microclustered water to create a molecular structure therein for the achievement of specific results.

Much of microcluster chemistry has focused on the ionization of metals and the formation of small metal cluster groups which elicit a significant change in chemical behavior. Such research is exemplified by Weiller, B. H., Bechtold, P. S., Parko, E. K., et al., The Reactions of Iron Clusters with Water. *Journal of Chemical Physics,* Vol. 91, Note. 8:4714–27 (Oct. 15, 1989); and Yang, X. L., Castleman, A. W., Large Protonated Water Clusters, *Journal of The American Chemical Society,* Vol. III, Note 17:6845–46 (Aug. 16, 1989). However, microcluster technology has also been concerned with the interaction of various solutes, such as proteins, nucleic acid and cellular material.

SUMMARY OF THE INVENTION

The present invention provides a method of producing microclustered liquid from liquid starting material which is preferably water, comprising boiling liquid starting material to produce starting material vapor, passing the starting material vapor across a magnetic field, exposing the starting material vapor to light, condensing the starting material vapor to produce microclustered water, and adding at least one stabilizer. Preferably, at least one template base is added, the microclustered water is placed under a pressure greater than 1 atmosphere. In a preferred embodiment the microclustered water is shaken, depressurized, and diluted between $10^3$ times and $10^{20}$ times with water. Preferably, the magnetic field is generated by materials, such as magnetite or iron oxides, which possess magnetic properties, the light is monochromatic light having a wavelength from 610 nanometers to 1 millimeter. The stabilizer preferably comprises a metasillicate compound, such as sodium metasillicate or lithium metasillicate and is added in a concentration between 0.1 ppm and 4 ppm. The template is preferably added in a concentration of 1.0% or less, more preferably 0.1% or less.

The present invention also provides the microclustered liquid produced by the foregoing method. In another aspect of the present invention, there is provided a process for producing a medicament for the treatment of an abnormal state in a living organism, comprising producing microclustered water by the foregoing process wherein the template has activity in treating the abnormal state. The resulting templated microclustered water can be administered to a living organism.

Still another aspect of the present invention is a process for producing a gasoline additive, by following the foregoing process using coal tar as template.

In a further aspect of the present invention, there is provided an apparatus for the production of microclustered water from purified water, comprising an energy source for boiling the purified water to create steam, a distillation column through which the steam is passed, a source of a magnetic field which generates a magnetic field within the distillation column while the steam passes therethrough, a condensation column in which the steam condenses after the steam has passed through the distillation column, and a light source which provides light energy to the steam in the condensation column. The apparatus preferably also includes a pressure resistant container in which condensed fluid from the condensation column can be pressurized, wherein the source of a magnetic field comprises a material which possesses magnetic properties such as magnetite or an iron oxide. These materials are preferably encased in a glass tube within the distillation column. The light source preferably comprises a monochromatic light source. such as a helium-argon laser, and also comprises a cooling coil surrounding the condensation column.

The present invention also provides microclustered water stably producing an $^{17}O$ NMR resonance signal less than 115 Hz, preferably between 25 Hz and 70 Hz, and more preferably between 60 Hz and 70 Hz. This water is preferably templated and has a conductivity of at least 3.7 $\mu S/cm$ and a surface tension of less than 61 dynes/cm.

The present invention also provides the following: a medicament for the promotion of healing of burns produced by a method comprising producing microclustered water by the foregoing process, wherein the template comprises aloe vera with vitamin E, a medicament for pain relief for a living organism, produced by a method comprising producing microclustered water by the foregoing process, wherein the template comprises an opiate peptide, a medicament for reducing the need for insulin in a mammal with adult onset diabetes, produced by a method comprising producing microclustered water by the foregoing process, wherein the template comprises chromium ions, a medicament for treating viral infections of a living organism, produced by a method comprising producing microclustered water by the foregoing process, wherein the template comprises a yeast culture or an antiviral pharmaceutical agent, a medicament for the promotion of growth of a living organism, produced by a method comprising producing microclustered water by the foregoing process, wherein the template comprises a yeast culture, and a chemical catalyst produced by a method comprising producing templated microclustered water by the foregoing process, wherein the template comprises an inorganic catalyst or an enzyme.

A process for the synthesis of microclustered water consisting of rings containing 3 to 15 molecules and their complexes. The solution is distilled in a reflux chamber and condensed in an ionization chamber with the product blended with a template base and treated under specific temperatures, gas environments, and pressures. This microclustered water may be used as a carrying solution in medicine, pharmaceuticals, agriculture and in facilitating chemical reactions.

DETAILED DESCRIPTION OF THE PREFERRED EMBODIMENT

I have discovered that the association of various materials, such as macromolecular or cellular material, with microclustered water can effect a permanent change in the moleculr structure of water when treated with appropriate stabilizers, as will be described hereinbelow. The particular macromolecular or cellular material functions as a template in that it has the ability to impart a particular change to the clustered water. The result on the water varies with the template used to effect the change. However, generally, the clustered water is modified so that it is useful in medicine, agriculture and other industries.

Figure 1:
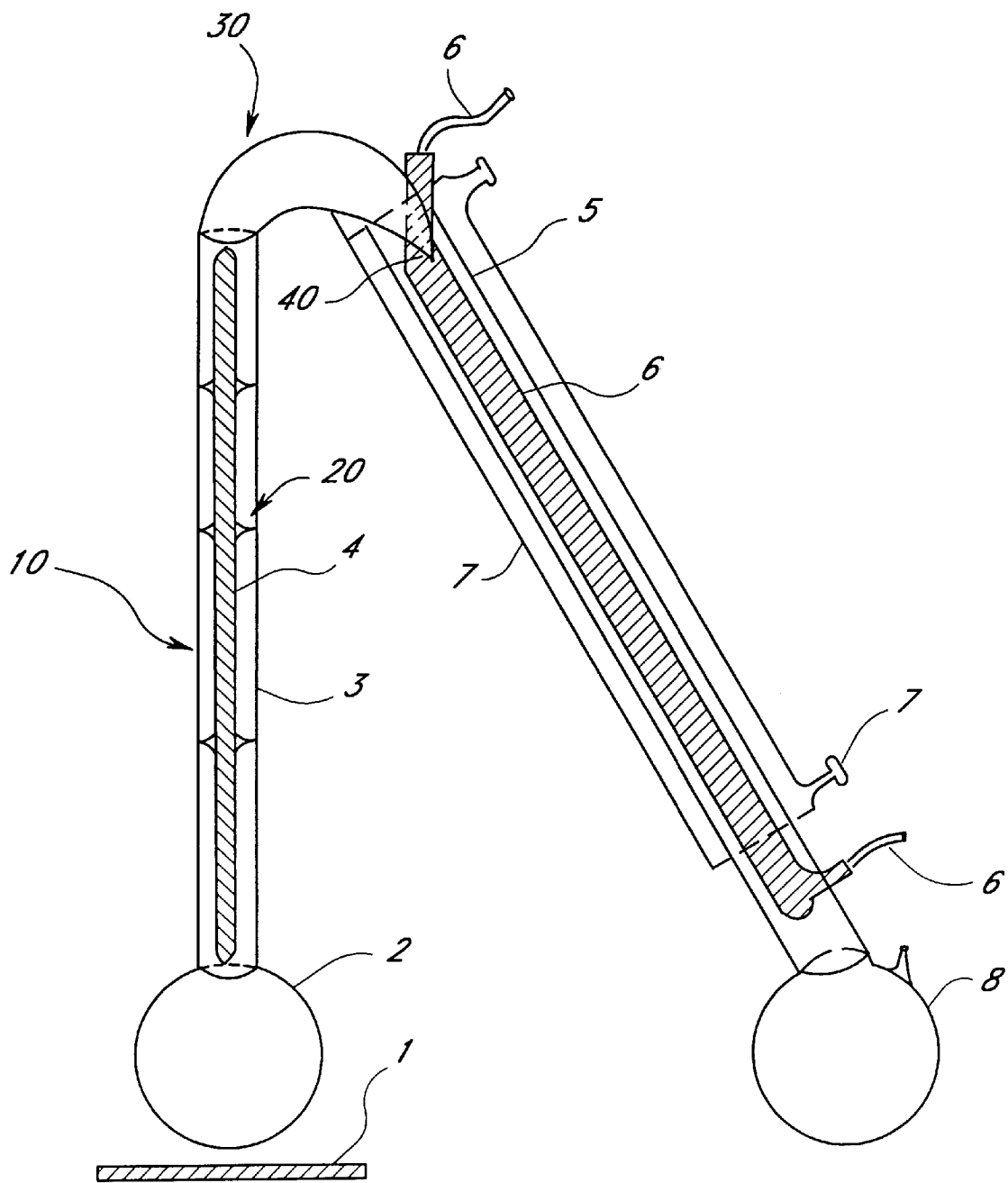
FIG. 1 is a front elevational view of the microcluster synthesizing apparatus.

Referring to FIG. 1, there has been provided in accordance with the present invention an embodiment of a microcluster synthesis device shown generally at 10. Generally, this embodiment uses a suitable heating source 1 to boil starting water that has been placed in a conventional container 2.

The starting water can be tap water, distilled water, or double distilled water, but is most preferably triple distilled water. When less purified water is used as starting water, the microclusters produced tend to be less stable.

The heating source can be any of a variety conventional heat sources, such as an electric coil. The container 2 is detachably connected to distillation column 3. Longitudinally extending within the length of distillation column 3 is a secondary column 4. The secondary column 4 is tapered and sealed at both of its ends to contain a material which produces a magnetic field. Preferably this material is a mixture of magnetite and iron oxides. Also, the diameter of the secondary column 4 is such that it allows unrestricted passage of steam theraround within the distillation column 3. Thus, in the preferred embodiment, the distillation column 3 has an inner diameter of 2.5 centimeters and the secondary column 4 has an outer diameter of 1.75 centimeters. The secondary column 4 is made from a very thin glass (e.g., conventional capillary tube glass) which has been formed into a straight walled cylinder, or one having convoluted walls that increase the surface area of the column 4. The secondary column 4 is suspended within the inside of column 3 by glass attachments, such as glass links 20, so that the flow of water steam is not significantly affected.

The distillation column 4 is connected to a bridge 30 which serves to transfer steam to a distillation column 5, described hereinbelow. In the preferred embodiment, the bridge 30 is a glass tubular arc which can be sealably connected to the distillation column 4. In the preferred embodiment shown, the end of the bridge 30 which connects to the condensation column 5 is tapered to a small outlet 40 which directs steam toward a light source 6, which will be described hereinbelow.

In the preferred embodiment, the glass of container 2 and column portions 3 and 5, for example, is conventional distillation glassware such as that of "Pyrex" brand. In contrast, the glass comprising tube 4 is a very thin glass like that used to make conventional capillary tubes.

The condensation column 5 is provided as a vapor condensation chamber wherein the condensed water is exposed to a light source 6, which is preferably monochromatic. In the embodiment shown, the light source 6 is a fluorescent-type tube which emits light which is preferably in the far infra-red to ultraviolet spectrum range, and more preferably in the far infra-red to red spectrum range. Thus, the more preferred spectrum is between 610 nanometers (nm) and 1 millimeter (mm). For many applications the most preferred wavelength is 640 nm.

As an example, the light source can be a tube containing inert gases and have sufficient power to emit light within the preferred spectrum range. Alternatively, the light source may be a laser, such as a helium-argon laser capable of emitting monochromatic light across a wide spectral range. When a laser is used as a light source, the laser is preferably configured to shine monochromatic light parallel to and through the length of the condensation column 5.

The condensation column 5 is surrounded by a cooling jacket 7 which is fed a continuous flow of cooling liquid to cause condensation of steam passing through the condensation column 5. The cooling liquid is preferably water, more preferably highly purified water such as triple distilled water. The water which condenses from the steam flowing into the condensation column 5 is microclustered water. This microclustered water is collected and contained in a detachable container 8. When all of the condensation product has been collected, it is transferred to a pressure cylinder 9, shown in FIG. 2.

Figure 2:
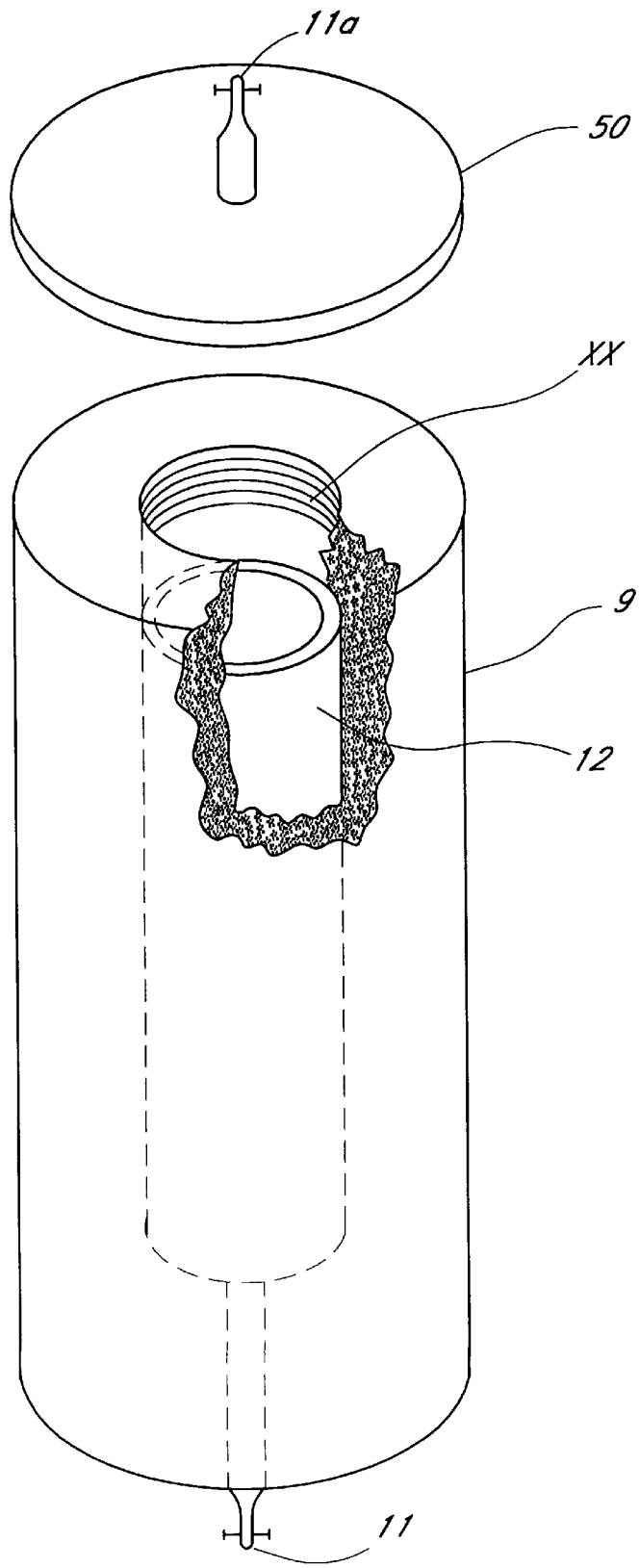
FIG. 2 is a partial perspective, front elevational view showing the pressure treatment cylinder of a preferred embodiment of the present invention.

Referring now to FIG. 2 in more detail, the cylinder 9 is a pressure resistant container with a removable threaded lid 50. Product from container 8 is placed into the glass-lined chamber 12 and the threaded lid 50 is closed shut. In the preferred embodiment, the closing of the lid 50 is accomplished by screwing into threads at the top of the chamber 12. To stabilize the clustered water, a stabilizer, such as an ionic salt complex is added to the condensation product placed in chamber 12. Preferred stabilizers include metasillicate salts of lithium, sodium, potassium, calcium, magnesium, zinc, nickel, chromium, iron, cobalt, copper, gallium, germanium, molybdenum, niobium, silver and gold, most preferably sodium metasillicate or lithium metasillicate. When needed, additional compounds, such as plasmalogen can be used to further stabilize the microclusters. Also, added to the condensation product in chamber 12 is a template base, as will be more fully described hereinbelow.

After adding the microclustered water, stabilizer and template to chamber 12, and closing it, compressed gases are fed through the bottom bleed valve 11 and allowed to infiltrate the contents of chamber 12. While the gas is being fed into the bottom of chamber 12, the upper bleed valve 11a is closed. A pressure indicator is attached to the cylinder 9 so that pressure readings can be made. Gas is continuously fed into chamber 12 until the appropriate pressure has been reached. The gases which may be used alone or in combination to pressurize the chamber include air, oxygen, helium, nitrogen, carbon dioxide, or inert gases.

Prior to releasing the gas, cylinder 9 is rotated 90° to a horizontal position and the water-template-stabilizer-gas mixture is shaken on a shaking table in a temperature-controlled environment. The shaking period is that necessary for template reproduction and synthesis. In the preferred embodiment, this shaking period lasts between 10 minutes and 24 hours. To optimize shaking time, samples can be removed and assayed for activity using, for example, an invitro assay for the activity desired.

Upon completion of the shaking step, the cylinder 9 is returned to a vertical position and the gas(es) slowly released via the upper bleed valve 11a. This shaken mixture may be preserved with a suitable preservative, such as alcohols, preferably ethanol. Depending upon the ultimate use for the product, the shaken mixture is diluted with pure untreated microclustered water from container 8 and/or tripled distilled water for optimizing biological/chemical efficacy.

The method by which the templated microclustered water product can be formed is now summarized. Water, such as tap or distilled, but preferably tripled distilled, is poured into container 2. As described above, more highly purified starting water allows the microclusters to have a higher ability to hold together. A conventional flame-type or electrical heating source 1 is applied to container 2 to boil the water therein to the point of vaporization as steam. As the steam ascends the distillation column 3, it is exposed to the magnetic field of the material contained in the secondary column 4. The strength of the magnetic field produced by the magnetite and oxide material within the secondary column 4 in the preferred embodiment increases with increasing temperature. The steam passes through the bridge 30 and is condensed in the cool water-jacketed condensation column 5. The outlet 40 directs the steam towards the light source 6 within the condensation column. While condensing, the water is exposed to the light from the light source. The cooling solution can be water which has been cooled to near 0° C., preferably 2°. The microclustered water obtained by this process is collected in container 8. This microclustered water is then transferred to chamber 12 within pressure chamber 9.

Added to the microclustered water is at least one stabilizer. This stabilizer is added in a concentration of between 0.1 parts per million (ppm) to 4 ppm. More preferably, it is added in a concentration in the range between 3 ppm and 4 ppm. Also added to the mixture in chamber 12 is at least one template. As previously described, the template material can be organic or inorganic. Template materials can be virtually any solute, including cells or cellular material.

The concentration of the template to be added is a function of molecular weight, water solubility, and the result sought to be obtained. However, generally, the template will be added in a concentration of 1% or less. For cellular templates, it has been found that template concentration of less than 0.5% are preferred, whereas for most other templates, concentration of less than 0.1% are preferred.

After addition of template and stabilizer, the mixture is pressurized to a pressure greater than 1 atmosphere. Where the template has medicinal activity, the resulting microclustered water can be administered in therapeutic doses to a living organism, such as tiny organisms, humans and animals, to treat a particular abnormal state. For example, where the template is aloe vera and vitamin E, the treated water can be used to treat burns. Where the template is an opiate peptide, the treated water can be administered to treat pain. Individuals having viral infections can be medicated by water treated with a yeast culture, such as yeast cells from the Caucasus Mountains of Soviet Georgia or an antiviral pharmaceutical agent. Where the template is chromium ions, treated water can reduce the need for insulin in a person having adult onset diabetes. Other therapeutic template materials include, but are not limited to, Co-Enzyme Q, vitamin C, vitamin E, bee propolis and beta carotene.

Thus, it is clear from the examples above that the template can be varied and customized to optimally treat a particular subject's needs. For methods of treating a living organism, methods of application to the organism include, but are not limited to, topical, parenteral and oral administration.

Likewise, where the template is coal tar, the template treated water can be used as a gasoline additive to reduce hydrocarbon emissions.

Generally, the treated water is diluted with the starting water (preferably triple distilled). The mixture of microclustered water is usually diluted from $10^3$ times to $10^{20}$ times. This dilution is required because generally the microclustered water obtained is too concentrated to be used appropriately. In some cases, higher doses may either be harmful or less effective than lower concentrations of the same templated microclustered water. Thus, in order to determine optimal dilution for therapeutic applications, a magnetic resonance analyzer can be used.

A magnetic resonance analyzer (MRA) measures a response similar to conventional galvanic skin response; however an MRA is much more sensitive. The MRA detects a wave pattern emitted by the body which is calculated as a galvanic skin response at very high frequencies. Exemplary MRA's are produced by Magnetic Resonance Diagnostics, Inc. of Thousand Oaks, Calif.

In order to determine an ideal dilution factor for a therapeutically templated microclustered water, a series of dilutions, e.g. 10 times (10×) dilutions, is first prepared. As discussed above, for most therapeutic templates, the ideal dilution will be within the range of $10^3\times$ and $10^2\times$.

A typical normal output would be approximately 100 gigahertz (GHz). A change in this response can usually be measured within two seconds of the placement of a bioactive solution on the skin of the hand. A bioactive solution having a beneficial effect will produce a decrease in resistance, while a bioactive solution having a negative effect will produce an increase. For example, if a lactose solution is placed on the hand of a lactose intolerant subject, an increase in resistance can be measured within two seconds, even though the subject feels no ill effects.

Thus, to test response to the therapeutically templated microclustered water, a body part, such as a hand, from a patient requiring therapy is first placed in contact with the MRA and the hi frequency galvanic skin response determined. The templated microclustered water used for testing will have been templated with material appropriate for treating the patient is then tested by placing the the various serial Dilutions on the skin of the patient's hand one at a time and the resistance measured on the MRA. The solution producing the greatest decrease in resistance gives the preferred dilution factor.

The templated microclusters have been shown to possess significant biological and chemical activity at extremely dilute concentrations. The template realigns the molecular structure of the microclustered water so that the resulting water provides beneficial resonant frequencies. The resultant resonancy frequencies are predictable depending upon the template material used. Template treated water samples can be tested by conventional nuclear magnetic resonance (NMR) analysis. I have found that $^{17}O$ NMR provides a good indication of the microclustering of the water. Using $^{17}O$ NMR, resonance frequencies of the template treated end products range from 25 to 140 hertz (Hz) and more. However, generally these products have resonance frequencies in the range 45 to 75 Hz. These frequencies are significantly different than the resonance frequencies measured of starting water. The resonance frequency of tap water is generally measured at 140 Hz, while the resonance frequency of distilled water is 130 Hz, and the resonance frequency of triple distilled water is 115 Hz. Even without template treatment, the microclustered water of the present invention has a resonance frequency significantly lower than highly purified triple distilled starting water. Microclustered water stably producing resonance frequencies as low as 25 Hz can be produced by the methods described herein.

For treatment of a living organism, microclustered water having a resonance frequency between 25 and 70 Hz is preferred, more preferably between 60 Hz and 70 Hz.

Further verification that the templated microclustered water has an ordered regular microclustered structure can be had by performing conventional X-ray diffraction fingerprinting on the samples.

Additional verification can be shown by changes in the conductivity and surface tension of the microclustered water. Thus, I performed physical measurements of these parameters on variously templated microclustered water in a clean room environment at 20° C.±0.5° and constant humidity using laser refraction by techniques known to those of skill in the art. These results are shown in Table 1.

TABLE 1

CONDUCTIVITY AND SURFACE TENSION OF TEMPLATED MICROCLUSTERED WATER VS. PURE WATER

| TEMPLATE | pH | CONDUCITIVITY μS/cm | SURFACE TENSION dynes/cm |
|---|---|---|---|
| pure water | 7.0 | 2.83 | 70.0 |
| carnitine | 9.2 | 5.16 | 50.1 |
| zinc | 8.7 | 5.14 | 52.0 |
| ClO$_2$ | 8.0 | 6.21 | 58.5 |
| pituitary | 6.8 | 5.73 | 46.8 |
| ascorbate | 6.5 | 5.43 | 48.5 |
| kmtm | 7.2 | 5.45 | 55.0 |
| ilium | 6.6 | 4.85 | 48.3 |
| vit. B12 | 6.6 | 5.82 | 60.3 |
| phycotene | 6.5 | 5.53 | 51.5 |
| EDTA | 7.1 | 4.66 | 51.6 |
| oxygen | 7.0 | 3.74 | 54.4 |
| arnica | 6.8 | 6.29 | 57.5 |
| myosin | 6.5 | 7.49 | 52.7 |
| pectin | 6.6 | 4.32 | 50.2 |
| Yeast culture | 7.6 | 6.28 | 53.7 |

Thus, it can be seen from the results shown in Table 1 that all of the templated waters have significantly higher conductivities and significantly lower surface tensions than pure water.

Dr. Herbert Frohlich, in "Coherent Excitations in Active Biological Systems" Springer-Verlag: Berlin, FRG (1985), predicted that living cells would be capable of channeling chemical energies into high frequency electrical and cooperative oscillations which were confirmed using laser Raman spectroscopy. Cooperative dipolar oscillations fed by cellular metabolic energy is believed to be a primary source of resonance patters, especially oscillating chemical reactions capable of producing charge waves.

H. A. Pohl, in "Dielectrophoresis: the behavior of matter in Nonuniform electric fields", Cambridge University Press (1978), has postulated that during the ionic phase of the reaction cycle, if the outward speed of the positive ions does not exactly match that of the negative ions, a charge wave will develop. It is believed that the charge will be conducted along the mitotic spindle apparatus, the walls of the endoplasmic reticulae (ER), the laminae of the cristae in mitochondria, the grana of chloroplasts, and the ionic double layers of the interfaces within the cell organelles. Drost-Hansen, W. and J. S. Clegg, in "Cell-associated water" Academic Press, New York (1979), theorize that the energetics of actin polymerization in the microtrabecular lattice (MTL) may be a key location for resonance energetics.

Microclustered water and the template complexes possess a unique potential in facilitating cellular chemical reactions and in stimulating resonance transfer of cellular energy. Thus, the methods described herein are believed to have nearly limitless applicability to living systems. Thus, for example, the following industrial applications are believed possible with these methods: medicine/pharmaceutical products produced using templates having pharmacological activity; cosmetics/skin care products produced using templates having activity in protecting skin; agricultural products produced using templates having fertilizing, insecticidal, herbicidal or repellant activity; and inorganic/organic chemical catalysts produced using inorganic catalysts, enzymes, or other organic catalysts as template. Thus, the applicability of the methods are wide ranging. I believe that the microcluster technology described herein can be applied to virtually any template to import the properties of the template into the resulting microclustered water. Thus, by selecting a proper template, microclustered water for virtually any pharmaceutical, agricultural, biological, or chemical use can be obtained.

It is believed that most embodiments of this invention produce microclusters of 3 to 15 molecules and their template complexes in solution. Microclusters of 5 to 7 molecules are believed to be more effective, with microclusters of 5 molecules being most effective. Larger clusters are believed to have a lower biomedical effect.

It is believed that the methods described herein can be used on any polar solvent, in addition to water. Thus, it is believed to make microclustered polar solvents, such as short-chain alcohols.

It is to be appreciated that certain variations will suggest themselves to those skilled in the art. The foregoing description is to be clearly understood as given by way of illustration rather than limitation. The spirit and scope of this invention is limited solely by the appended claims.

I claim:

1. Microclustered water produced from a starting water by a method comprising the following steps performed sequentially:

(a) boiling said starting water to produce steam;

(b) passing said steam across a magnetic field;

(c) condensing said steam at a temperature greater than 0° C. in the presence of light in the far infra-red to ultraviolet spectrum range to produce condensed steam;

(d1) adding at least one stabilizer to said condensed steam, wherein the stabilizer comprises a metasilicate salt;

(d2) adding a dietary supplement template to said condensed steam to produce a concentration of said dietary supplement template of 1% or less; wherein steps (d1) and (d2) are performed in either order;

(e) exposing the condensed steam to a pressure greater than 1 atmosphere; and (f) depressurizing said condensed steam, thereby producing said microclustered water, wherein the microclustered water produces an $^{17}O$ NMR resonance signal less than 115 Hz, has a conductivity of at least 3.7 $\mu$s/cm, and has a surface tension of less than 61 dynes/cm.

2. The microclustered water of claim 1, wherein the method of producing said microclustered water additionally comprises shaking said microclustered water prior to the depressurizing step.

3. The microclustered water of claim 1, wherein the method for producing said microclustered water additionally comprises diluting the microclustered water.

4. The microclustered water of claim 3, wherein the microclustered water is diluted between $10^3$ times and $10^{20}$ times.

5. The microclustered water of claim 1, wherein said starting water is three times distilled water.

6. The microclustered water of claim 1, wherein the magnetic field is generated by materials which possess magnetic properties.

7. The microclustered water of claim 6, wherein said materials comprise magnetite or iron oxides.

8. The microclustered water of claim 1, wherein the method for producing said microclustered water additionally comprises exposing said water to light having a wavelength of between approximately 610 nanometers to 1 millimeter.

9. The microclustered water of claim 8, wherein said light is monochromatic light.

10. The microclustered water of claim 9, wherein said monochromatic light has a wavelength of 640 nm.

11. The microclustered water of claim 1, wherein said cooling solution is water.

12. The microclustered water of claim 1, wherein said metasilicate salt is sodium metasilicate or lithium metasilicate.

13. The microclustered water of claim 1, wherein the stabilizer is added in a concentration between 0.1 ppm and 4 ppm.

14. The microclustered water of claim 1, wherein the nutritional supplement is added at a concentration of 0.1% or less.

15. The microclustered water of claim 1, wherein said light is produced by a helium-argon laser.

16. The microclustered water of claim 1, wherein said resonance signal is between 25 Hz and 70 Hz.

17. The microclustered water of claim 1, wherein said resonance signal is between 60 Hz and 70 Hz.

18. The microclustered water of claim 1, wherein said nutritional supplement is a vitamin.

19. The microclustered water of claim 1, wherein said nutritional supplement is a plant extract.

20. The microclustered water of claim 1, wherein said dietary supplement template is selected from the group consisting of vitamins, minerals, enzymes, yeast, aloe vera, coenzyme Q, bee propolis, and beta carotene.

* * * * *